United States Patent
Matsumoto et al.

[11] Patent Number: 5,922,270
[45] Date of Patent: Jul. 13, 1999

[54] PROCESS FOR PRODUCING MOLDED ARTICLE HAVING A HOLLOW PORTION FROM A THERMOPLASTIC RESIN

[75] Inventors: Masahito Matsumoto; Nobuhiro Usui; Satoru Funakoshi; Akihiro Furuta, all of Osaka, Japan

[73] Assignee: Sumitomo Chemical Co., Ltd., Osaka, Japan

[21] Appl. No.: 08/803,090

[22] Filed: Feb. 20, 1997

[30] Foreign Application Priority Data

Feb. 20, 1996 [JP] Japan .................................. 8-031939

[51] Int. Cl.$^6$ .................................................. B29C 45/00
[52] U.S. Cl. .......................................... 264/513; 264/572
[58] Field of Search .................................. 264/513, 572

[56] References Cited

U.S. PATENT DOCUMENTS

| | | |
|---|---|---|
| 4,968,474 | 11/1990 | Ito . |
| 5,277,865 | 1/1994 | Hara et al. . |
| 5,478,627 | 12/1995 | Hara et al. . |
| 5,534,216 | 7/1996 | Kamiyama .............. 264/513 |
| 5,562,878 | 10/1996 | Matsumoto et al. . |

FOREIGN PATENT DOCUMENTS

| | | |
|---|---|---|
| 57-14968 | 3/1982 | Japan . |
| 4-59211 | 2/1992 | Japan . |
| 6-6308 | 1/1994 | Japan . |
| 6-22834 | 3/1994 | Japan . |
| 6-122129 | 5/1994 | Japan ......................... 264/572 |
| 6-35138 | 5/1994 | Japan . |
| 7-315 | 1/1995 | Japan . |
| 7-20637 | 3/1995 | Japan . |
| 7-35058 | 4/1995 | Japan . |

*Primary Examiner*—Catherine Timm
*Attorney, Agent, or Firm*—Pillsbury Madison & Sutro LLP

[57] ABSTRACT

A process for producing a hollow article in an assembly comprising first and second mold members movable relative to each other between a closed position in which an inner surface of the assembly defines a cavity and an open position. The cavity is shaped to define a corresponding configuration to the article. According to this process, a charge containing at least one molten thermoplastic resin is supplied at the first and/or second mold member while the mold members are not in the closed position. The first mold member is moved relative to the second mold member into the closed position so as to define the cavity, and a first clamping force F1 is applied to the first and second mold members. The charge is then compressed within the mold cavity under the first clamping force F1. Thereafter, the clamping force is reduced from the first clamping force F1 to a second clamping force F2 before the molten thermoplastic resin in the mold cavity has completely solidified. A compressed gas is supplied into at least one unsolidified portion of the molten thermoplastic resin subsequent to the step of closing the mold members and before the molten thermoplastic resin in the mold cavity has completely solidified. The molten thermoplastic resin can then be cooled in the mold cavity and solidified while supplying the compressed gas.

18 Claims, 2 Drawing Sheets

PROCESS FOR PRODUCING MOLDED ARTICLE HAVING A HOLLOW PORTION FROM A THERMOPLASTIC RESIN

BACKGROUND OF THE INVENTION

1. Field of the Invention

The present invention relates to a process for producing a molded article having a hollow portion from a molten charge comprising at least one thermoplastic resin.

2. Description of the Related Art

As a process for producing a hollow article, Japanese Patent Examined Publication No. Shou 57-14968 discloses supplying a molten resin into a closed mold cavity, the amount of the molten resin not being sufficient to fill the mold cavity, and then supplying a compressed gas or a combination of a compressed gas and an additional amount of molten resin into the mold cavity. This related art process, however, is disadvantageous insofar as the resulting hollow molded article has surfaces that exhibit hesitation marks or switching marks (i.e., an unevenness of luster), which are caused by changes in pressure applied to the molten resin while the molten resin is spreading in the cavity.

Japanese Patent Examined Publication No. Hei 7-315 discloses a process wherein a mold cavity is filled with a molten resin and then compressed gas is fed into the molten resin. This latter process, however, is also plagued with problems. For example, assistant equipment, such as a slidable core which is movable in t he mold cavity and the like, is required in order to increase a volume of the mold cavity to form a hollow portion. Tooling having such assistance equipment is often quite expensive and requires high maintenance.

A need therefore exists to provide a process for producing a hollow molded article in which the resulting hollow molded article has a good surface appearance without any hesitation marks, and a process in which expensive and high-maintenance assistant equipment is not required.

SUMMARY OF THE INVENTION

It is, therefore, an object of the present invention to solve the aforementioned problems associated with the related art as well as the need expressed above. In accordance with the principles of the present invention, this object is obtained by providing a process for producing a hollow article comprising the following steps:

(a) providing an assembly comprising first and second mold members movable relative to each other between a closed position in which at least a portion of an inner surface of the assembly defines a mold cavity and an open position, the cavity being shaped to define a corresponding configuration to the article;

(b) supplying a charge containing at least molten thermoplastic resin to the first mold member and/or the second mold member, the supplying step (b) being performed while the mold members are not in the closed position so that the supplying step (b) is completed prior to or simultaneous with the time at which the mold members reach the closed position;

(c) moving the first mold member relative to the second mold member into the closed position so as to define the cavity;

(d) compressing the charge within the mold cavity by applying a first clamping force F1 to the first and second mold members to uniformly distribute the resin through the cavity and fill the cavity;

(e) reducing the clamping force from the first clamping force F1 to a second clamping force F2 before the molten thermoplastic resin in the mold cavity has completely solidified and compressing the molten thermoplastic resin with the second clamping force F2;

(f) supplying a compressed gas into at least one unsolidified portion of the molten thermoplastic resin subsequent to the step (c) of moving the first member relative to the second member and into the closed position and before the molten thermoplastic resin in the mold cavity has completely solidified;

(g) cooling the molten thermoplastic resin in the mold cavity until the molten thermoplastic resin is at least substantially solidified; and (h) continuing the step (f) of supplying a compressed gas at least until the molten thermoplastic resin is at least substantially solidified so as to prevent deformation of the article.

In accordance with the principles of the present invention, the foregoing embodiment can be modified to include at least one additional step in which the clamping force is changed from the second clamping force F2 to a third clamping force F3 before the molten thermoplastic resin in the mold cavity has completely solidified.

According to the above-discussed embodiments of the present invention, a hollow article having a good appearance with no hesitation marks can be produced without requiring any assistant equipment, such as a sliding core.

The principles of the present invention enunciated above are applicable to the production of most types of hollow molded articles, but have particular applicability to automobile interior parts, such as instrument panels, console boxes, and the like.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWINGS

The accompanying drawings illustrate the present invention. In such drawings.

DETAILED DESCRIPTION OF THE INVENTION

Figure 1:
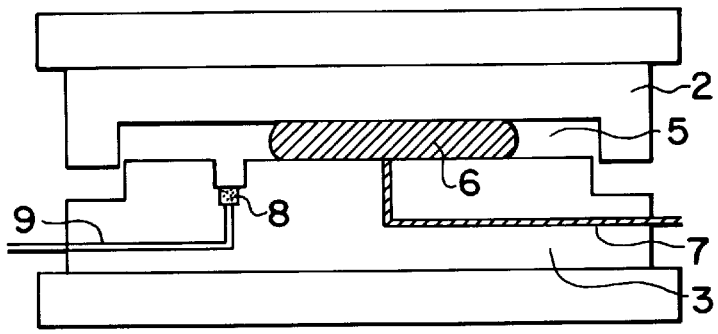
FIG. 1 is a sectional view of an assembly suitable for the process of the present invention, the assembly being in an open position with a charge of thermoplastic resin received therein.
Figure 2:
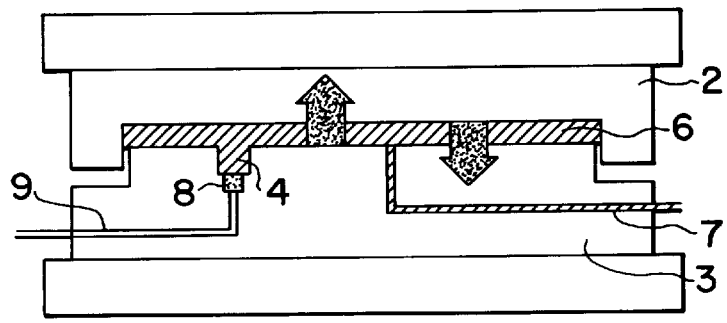
FIG. 2 is a sectional view of the assembly shown in FIG. 1, the assembly being in a closed position with the charge of thermoplastic material being compressed in the cavity.
Figure 3:
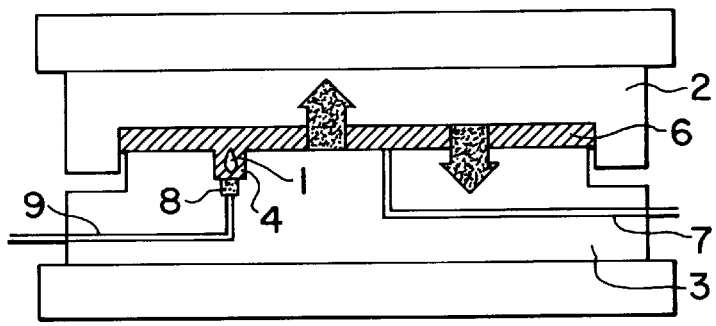
FIG. 3 is a sectional view of the assembly shown in FIG. 1, the assembly being in a closed position and receiving a supply of compressed gas.

Referring now more particularly to the drawings, there is shown in FIG. 1 an assembly, which is generally designated by reference numeral 10. The assembly 10 comprises a male mold member 3 and a female mold member 2 movable relative to each other between an open position (FIG. 1) and a closed position (FIGS. 2 and 3). The female and male mold members 2 and 3 have inner surfaces that, when in a closed position, collectively define a mold cavity 5 whose shape corresponds to a configuration of a desired hollow article. At least one of the mold members 2 and 3 is movable towards the other member from the opened position to the closed position. Hereinafter, this direction will be referred to as a mold clamping direction.

The process of the present invention is particularly suitable for producing an article having one or more thick portions, generally designated in FIG. 3 by reference numeral 4. In a case of producing an article having a thick portion 4 with a hollow region 1 disposed therein, one or more recesses can be disposed in the inner surface of the assembly 10 to permit the formation of the thick portion(s) 4. The recess(es) can be positioned at an arbitrary position(s) such as, for example, a peripheral position and/or a central position of the mold surface. The thick portion of the hollow article is defined as a portion which is relatively thicker than the other remaining and/or surrounding portions of the hollow molded article. It is not required that a boundary between the thick portion and the remaining main portion of the hollow molded article be visually distinct to the naked eye. For example, the thickness of the hollow article can be gradually increased or reduced, with the thick portion 4 having a thickness which is relatively larger than that of an adjacent portion. It is also not required that the thickness of the thick portion 4 and the main portion be uniform. Further, in a hollow article having a protrusion, the protrusion can be defined as the thick portion 4.

In accordance with an embodiment of the process of the present invention, a charge 6 containing at least one molten thermoplastic resin is introduced between the male mold member 3 and the female mold member 2 while the mold members 2 and 3 are not closed, as shown in FIG. 1. Then, as shown in FIG. 2, the mold members 2 and 3 are closed in the mold clamping direction to define the mold cavity 5. A first clamping force F1 is applied to the charge 6 from the mold members 2 and 3 while the mold members are in the closed position. By applying this first clamping force F1, the charge is compressed and distributed throughout the mold cavity 5.

Here, the first clamping force F1 is at least a force sufficient to spread the charge 6 to fill the mold cavity 5 and compress the molten thermoplastic resin. As referred to herein, the clamping force means a total pressure received by the charge 6 from an entire inner surface of the mold member 2 or 3 along a mold clamping direction (i.e., the direction generally indicated by the arrows in FIGS. 2 and 3), unless otherwise stated. Although a magnitude of the first clamping force F1 varies with the size of the desired hollow article, it is generally within the range from at least about 10×A kgf to about 200×A kgf (kilogram-force) so as to spread the charge 6 throughout the mold cavity 5.

Figure 4:
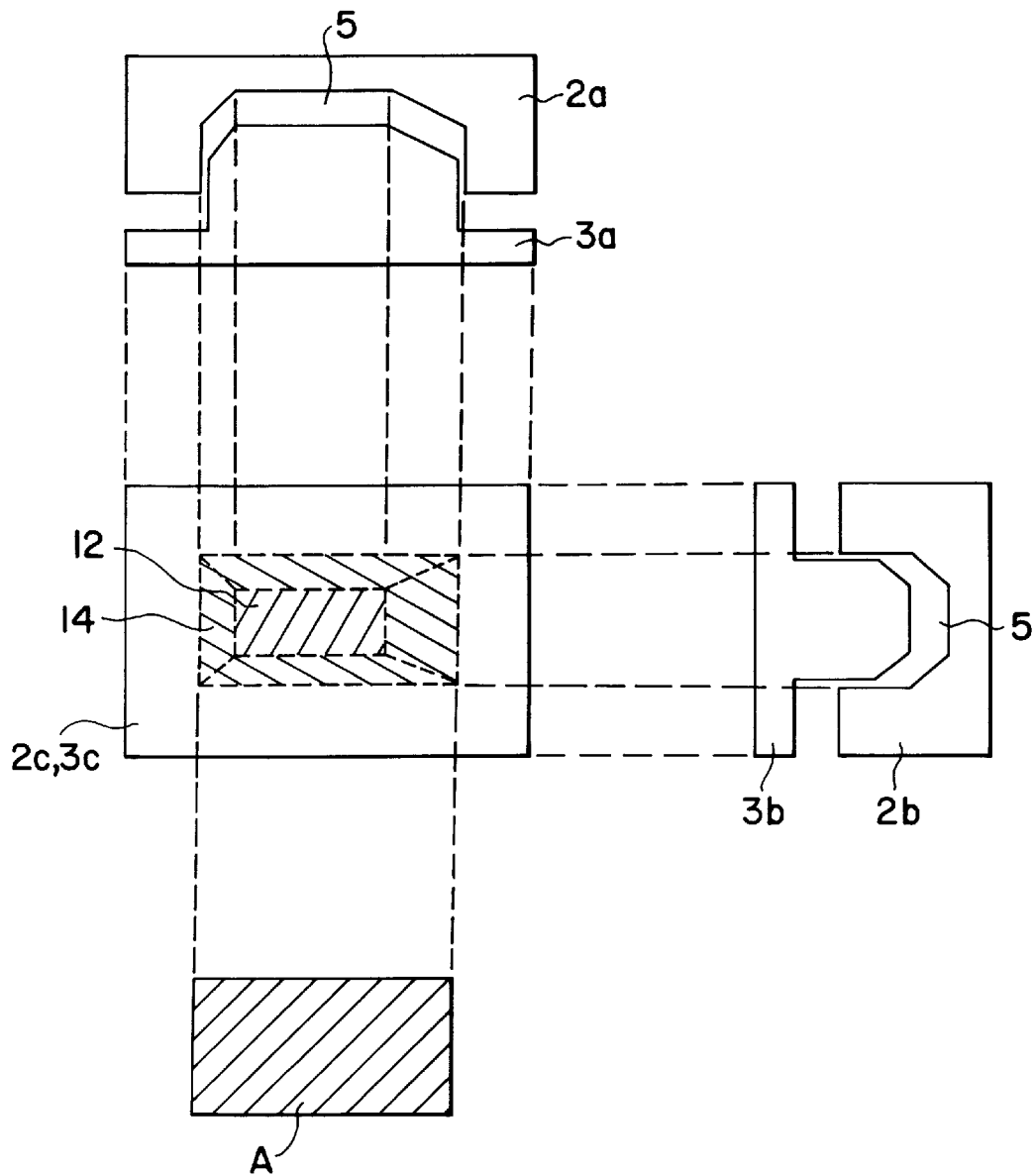
FIG. 4 is an explanatory, schematic view of a rectangular block having a beveled upper surface.

As referred to herein, "A" refers to the total projected area (cm²) of a mold cavity defined by the mold members 2 and 3 on an imaginary plane arranged perpendicular to the mold clamping direction. For example, the projected area "A" of a rectangular block having a beveled upper surface is explained with reference to FIG. 4. As explained above, the first and second mold members 2 and 3 have inner surfaces that, when in a closed position, collectively define the mold cavity 5 whose shape corresponds to the outer configuration of the desired hollow article. The front sectional and rotated side sectional views of mold member 2 are illustrated in FIG. 4 and generally designated by reference numerals 2a, 3a, 2b and 3b, respectively. A perspective view from the bottom of mold member 2 is generally designated by reference numeral 2c and 3c. This persepctive view depicts the total projected area "A" as being the sum of a first projected area 12 (arranged on a plane that is perpendicular to the mold clamping direction) and the maximum second projected area 14 (arranged on a plane that is not perpendicular to the mold clamping direction).

With regard to the steps of supplying the charge 6 to the male and/or female mold members 2 and 3 and closing the mold members 2 and 3 to define the cavity 5, the closing of the mold members can commence after the charge 6 has been completely supplied to the mold members 2 and/or 3, or can commence while the charge 6 is being supplied and optionally can be continued while the charge 6 is being supplied so that the closing of the mold members 2 and 3 is completed simultaneous with the completion of supplying the charge 6 to the mold cavity 5. The relationship between the timing when the clamping force reaches the first clamping force F1 and the timing when the mold cavity 5 is filled with the charge 6 includes various embodiments, and can vary depending on factors such as, for example, the magnitude of F1, the viscosity of the molten thermoplastic resin, the size of the desired hollow article, the size of the surfaces of the mold members 2 and 3, and the like. In most cases, the mold cavity 5 is filled with the charge 6 before the clamping force reaches F1. However, for example, when the viscosity of the charge 6 is relatively high or the size of the desired hollow article is relatively large, the filling of the mold cavity 5 with the charge 6 can be completed simultaneous with or subsequent to a time when the clamping force reaches F1.

In the present invention, a resin passageway 7 or runner can be employed for supplying the charge 6 containing at least one molten thermoplastic resin to the male mold 3 and/or the female mold 2. In addition, the charge 6 can be supplied by an outer supplying means with a resin supplying nozzle (not shown). The former method of employing a passageway 7 is preferred for avoiding cooling the molten thermoplastic resin before closing the mold members 2 and 3. When closing of the movable mold members 2 and 3 commences concurrently with the step of supplying the charge 6 to the mold members 2 and 3, the charge 6 is preferably supplied through the resin passageway 7.

Thus, the charge 6 is supplied to the mold cavity 5 and fills the mold cavity 5 by closing the male mold member 3 and the female mold member 2 in the mold clamping direction until the mold members 2 and 3 are in a closed position, with the first clamping force F1 compressing the charge 6. Thereafter, the mold clamping force is reduced from the first clamping force F1 to a second clamping force F2 and compression of the charge 6 containing the molten thermoplastic resin in the mold cavity 5 with the second clamping force F2 is continued. The second clamping force F2 is smaller than the first clamping force F1, and is suitably determined according to the configuration of the desired hollow article and molding conditions such as, for example, the pressure at which the compressed gas is supplied into the cavity 5 and the like, so as not to generate any remarkable warp or deformation in the hollow article.

In general, F2 is determined within a range of from at least about 1×A kgf to about 150×A kgf, preferably in a range of from about 5×A kgf to about 100×A kgf, and more preferably in a range of from about 10×A to about 50×A kgf. As referred to herein, "A" refers to the total projected area (cm²) of a mold cavity defined by the mold members 2 and 3 on an imaginary plane arranged perpendicular to the mold clamping direction.

Reducing the clamping force from F1 to F2 can be performed at an arbitrary time after the commencement of compressing the charge 6 in the mold cavity 5 with the clamping force F1, so long as the reduction in clamping force is performed before the molten thermoplastic resin is completely solidified. For example, the pressure can be reduced immediately after the start of compression at clamping force F1 or immediately before the molten thermoplastic resin compressed with F1 is completely solidified, or anywhere therebetween.

In selecting the amount of time that is permitted to pass from the initiation of compression of the charge with the clamping force F1 to the time at which the clamping force is reduced from F1 to F2, consideration should be given to the rate of solidification of the charge, the supplying pressure of the compressed gas, and the like. Accordingly, the clamping force is preferably reduced from F1 to F2 about 1 second to about 15 seconds after the compressive force F1 is first applied. This time period will vary in accordance with the particular thermoplastic resin or resins and additives selected, as well as the thickness of the article to be formed and the temperature to which the charge 6 and/or mold assembly 10 is heated.

After the clamping force has been reduced from F1 to F2, the clamping force can optionally be further raised from F2 to a third clamping force F3 and maintained so that the molten thermoplastic resin is cooled and solidifies at clamping force F3. A hollow article having an excellent appearance can be produced by performing the compression with the clamping force of F3. The clamping force F3 may be lower than, or the same as, or higher than F1. Although the third clamping force F3 is generally determined according to the shape of the desired hollow article or molding conditions, such as the supplying pressure of the compressed gas and the like, the third clamping force F3 is preferably lower than three times F1.

After filling the mold cavity 5 with the charge 6 of the molten thermoplastic resin and compressing the molten thermoplastic resin, a compressed gas is supplied into at least one unsolidified portion of the molten thermoplastic resin filling the mold cavity 5. Then, the molten thermoplastic resin is cooled and thereby solidified while the compressed gas is being supplied. This step is shown in FIG. 3.

Although supplying the compressed gas may be started at an arbitrary time between closing the mold members 2 and 3 to define the mold cavity 5 and solidifying the molten thermoplastic resin in the mold cavity 5, it is preferred that the step of supplying the compressed gas to the mold cavity 5 be initiated simultaneous with or subsequent to reducing the clamping force from F1 to F2. In general, the step of supplying the compressed gas to the mold cavity 5 is continued until the molten thermoplastic resin is cooled and solidified in the mold cavity 5. Before terminating the supply of the compressed gas to the mold cavity 5, the molten thermoplastic resin is substantially completely solidified so as to prevent deformation of the resin. However, it is not required that the molten thermoplastic resin be thoroughly solidified prior to terminating the supply of compressed gas to the mold cavity 5.

Suitable compressed gases include, by way of example and without limitation, compressed air, compressed nitrogen, compressed carbon dioxide, any combination thereof, and the like. Compressed air is preferred. Although a supplying pressure of the compressed gas is not restricted, the pressure is preferably less than about 10 kgf/cm$^2$, and more preferably within the range of 1 kgf/cm$^2$ or more and less than 10 kgf/cm$^2$. The supplying pressure of the compressed gas may be maintained constant as the compressed gas is supplied to the cavity 5; alternatively, the supplying pressure can be altered as the compressed gas is supplied to the cavity 5.

According to one preferred embodiment of the present invention, the compressed gas is supplied under a pressure "p" within the range of 1 kgf/cm$^2$ or more and less than 10 kgf/cm$^2$, and the supplying pressure p (kgf/cm$^2$) and the second clamping force F2 (ton f) satisfy the following relationship:

$$0.3 \times F2 \times 1000 \div A \leq p \leq 3 \times F2 \times 1000 \div A,$$

wherein:

A (cm$^2$) refers to the total projected area (cm$^2$) of a mold cavity defined by the mold members 2 or 3 on an imaginary plane arranged perpendicular to the mold clamping direction.

A method for measuring the mold clamping force is not particularly limited. For example, when an oil pressure-type press machine including a press unit and the mold members 2 and 3 is used as a molding assembly, the mold clamping force can be calculated as a product of the oil pressure in a cylinder of the press unit by the sectional area of the cylinder.

Where this equation is satisfied, the supply of the compressed gas is smoothly progressed, a satisfactory hollow portion is formed, and a hollow article having a surface that exhibits a good appearance and little deformation or unevenness can be obtained.

The compressed gas is generally supplied into the mold cavity 5 from a gas supplying member 8 provided in the male mold member 3 and/or the female mold member 2. An end of the gas supplying member 8 distal to the mold cavity 5 is connected with a gas passageway 9. The gas passageway 9 is connected with a gas supplying source (not shown). The gas passageway 9 has valves (not shown) such as, for example, a gas passageway open/shut valve to initiate and terminate the supply of the compressed gas and a pressure controlling valve to adjust the supplying pressure of the compressed gas. An end of the gas supplying member 8 proximal to the mold cavity 5 may be on the same level as, or above or beneath the inner surface of the assembly 10 defining the mold cavity 5. The gas supplying member 8 may be, for example, a movable pin in which the proximal end projects into the mold cavity 5 when the compressed gas is supplied.

The configuration and structure of the gas supplying member 8 is not particularly limited so long as the compressed gas is able to be supplied into the mold cavity 5. The gas supplying member 8 may be made, for example, of a porous material which has many open-microcells which function as gas paths. Examples of such a porous material include the following: a sintered metal such as sintered copper and sintered stainless steel; a sintered resin such as sintered fluorine plastic; foamed aluminum; porous ceramics; and any combination thereof.

The gas supplying member 8 may be a formed body having one or more gas paths, each extending from the distal end to the proximal end of the member 8. The gas paths can be located at the peripheral region of the gas supplying member 8 and/or at an interior region of the gas supplying member 8. The shape of the formed body is arbitrary and can be, for example, cylindrical or prism-like. In such a formed body, the number of gas paths is not particularly limited. The formed body can generally be made of a material having an excellent thermal resistance and hardness, such as, for example, a metal, alloy, and/or ceramic. In the formed body, when one or more of the gas paths are formed at the peripheral region (i.e., the surface) of the gas supplying member 8, the gas paths can each be, for example, a groove extending from the distal end to the proximal end of the gas supplying member 8. On the other hand, when the gas path is position at an interior region of the gas supplying member 8, the gas path can be defined, for example, as a penetrating hole extending from the distal end to the proximal end of the gas supplying member 8. A cross-sectional configuration of the gas path (taken along a direction perpendicular to the direction in which the gas flows) may possess any conventional or arbitrary shape, such as circular, semicircular, V-shape, U-shape, or rectangular.

The compressed gas is preferably supplied into the mold cavity 5 as multiple streams of compressed gas. Therefore, it is also preferable that a plurality of grooves and/or penetrating holes be defined in one or both of the mold members 2 and 3 or gas supplying members 8. In order to avoid choking the gas paths due to the entrance of the molten thermoplastic resin, the sectional area of an opening of each the gas path is preferably not larger than 0.03 mm$^2$. In a case that the porous material is used for the gas supplying member 8, an opening of each open-microcell is preferably not larger than about 0.03 mm$^2$ to accomplish these objectives.

As an alternative to the gas supplying member 8, the gas passageway 9 may directly open to the inner surface of the assembly 10 defining the mold cavity 5. In this case, in order to produce multiple streams of the compressed gas, the gas passageway 9 is preferably divided into a plurality of the fine paths connected to the mold cavity 5 and having, for example, a rake shape (not shown) near the inner surface of the assembly 10.

It is preferable to provide a lagging material around the gas supplying member 8 or the openings of the gas passageways directly opening to the mold surface. The lagging material delays the progress of solidification of the molten thermoplastic resin therearound to make the supply of the compressed gas easier. As referred to herein, lagging material denotes a material that assists in preventing the formation of a prematurely solidified skin layer on the surface of the molten resin in contact with the mold surface defining the cavity 5 by suppressing the direct heat transfer from the molten thermoplastic resin introduced into the cavity 5 to the mold members 2 and 3. The lagging material thus delays the progress of solidification of the thermoplastic resin. Two exemplary lagging materials include a thermal insulator, such as an epoxy resin, and a localheater.

The compressed gas is supplied to at least one unsolidified portion of the charge 6 containing the at least one molten thermoplastic resin filling the mold cavity 5. In general, if the molten thermoplastic resin contacting with the proximal end of the gas supplying member 8 is solidified, the compressed gas is not able to be supplied into the molten thermoplastic resin. Therefore, it is generally desired that the gas supplying member 8 be provided at a position with respect to the mold surface corresponding to a portion of the molten thermoplastic resin which is unsolidified when the introduction of the compressed gas into the cavity 5 is commenced. Thus, the gas supplying member 8 is preferably provided at a position of the mold surface corresponding to a portion of the molten thermoplastic resin that is the most difficult to solidify. In general, the thicker the portion of the molten thermoplastic resin, the greater the amount of time required for the molten thermoplastic resin to solidify. Therefore, when a hollow article having a thick portion is to be produced, the gas supplying member 8 is generally provided at a position where the thick portion will be formed. Even if a skin layer is formed at the mold surface defining the mold cavity 5 during solidification of the molten thermoplastic resin, the compressed gas can be fed into the molten thermoplastic resin by supplying a high pressure compressed gas that penetrates through the skin layer. A plurality of gas supplying members may be provided according to a size or shape of the hollow article to be produced, or a size or shape of the hollow portion 1 to be formed.

On the other hand, a movable pin type gas supplying member can also be used, whose proximal end is capable of projecting into the mold cavity 5, even if the molten thermoplastic resin is contacted with the mold surface and a skin layer is formed. Since the gas supplying member 8 can pierce the skin layer, it will be sufficient that the molten thermoplastic resin is unsolidified around the tip of a pin of the gas supplying member 8 projecting into the mold cavity 5.

The molten thermoplastic resin is cooled and thereby solidified in the mold cavity 5 while the compressed gas is being supplied into the cavity 5. Then, the supply of the compressed gas is stopped, and finally the mold members 2 and 3 are opened and the hollow article is removed from the mold cavity 5. When the supplying pressure of the compressed gas is high, the compressed gas is, in general, purged before opening the mold members 2 and 3. When a compressed gas other than compressed air is used, the compressed gas can be recovered, if necessary or desirable . If low pressure compressed air is used, it is not necessary to purge the gas prior to opening the mold members 2 and 3 to recover the low pressure gas.

According to the process of the present invention, a hollow article formed from at least one thermoplastic resin, particularly a hollow article having a thick portion 4 with a hollow portion 1 defined therein, is easily obtained.

Thermoplastic resins employable in conventional molding methods such as injection molding, injection compression molding, extrusion molding, stamping molding and the like are suitable for the process of the present invention. Examples of a suitable thermoplastic resins include, without limitation, one or more of the following: conventional thermoplastic resins such as polyolefin resins such as polyethylene and polypropylene, polystyrene, polycarbonate, acrylonitrile-butadiene-styrene copolymer, nylon and the like; thermoplastic elastomers such as ethylene-propylene block copolymer, styrene-butadiene block copolymer and the like; and polymer alloys thereof. The thermoplastic resin may contain various conventional additives such as, without limitation, fillers such as talc and glass fiber, pigments, lubricants, antistatic agents, antioxidants and the like.

In the above-mentioned process, a hollow article in which a skin material is laminated on a surface of a thermoplastic resin hollow substrate can be produced by supplying a skin material between the male mold member 3 and the female mold member 2 prior to supplying the charge 6 containing the at least one the molten thermoplastic resin, and thereafter performing the above-mentioned operations. In this case, the gas supplying member 8 or an equivalent means is provided in a mold member 2 or 3 not contacting with the skin material.

Examples of suitable skin materials include, without limitation, papers, woven fabrics, non-woven fabrics, knitted fabrics, nets such as a wire net, sheets, or films of a thermoplastic resin or thermoplastic elastomer. The skin material may have a decoration such as uneven patterns, grain patterns, and/or printing. The skin material may be lined with a foamed sheet of polypropylene, polyethylene, poly(vinyl chloride), polyurethane, any combination thereof, and the like. Thermoplastic elastomer sheets may also be used as a lining material of the skin material in order to protect the skin material from heat generated by the molten thermoplastic resin or pressure applied by mold clamping or to improve the adhesive property between the molten thermoplastic resin and the skin material.

In performing the process of the present invention, various conditions and process parameters such as, for example, the temperature of the molten thermoplastic resin, the injection pressure, the injection rate of the molten thermoplastic resin, the cavity clearance at the time the molten thermoplastic resin is provided to the cavity 5, the clamping rate (i.e., the mold closing rate), and the temperature of the mold members 2 and 3 can be suitably selected according to a sort of the molten resin used, the shape and size of the mold members 2 and 3, whether the skin materials employed, and the like.

A process for making hollow molded articles from thermoplastic resins is disclosed in the priority document 08-031939, filed in Japan on Feb. 20, 1997, the complete disclosure of which is incorporated herein by reference.

EXAMPLES

The present invention will be explained in detail by the following no-limiting examples.

Example 1

A hollow article was produced by using a mold assembly 10 including a male mold member 3 and a female mold member 2, whose schematic sectional view is shown in FIG. 1.

The projected area of the inner surface of each of the mold members 2 and 3 on a plane perpendicular to the mold clamping direction was 3,600 cm².

A sintered copper, cylindrical gas supplying member 8 having a diameter of 10 mm and a length of 10 mm was contained within the assembly 10. The gas supplying member 8 was provided at a position in the male mold member 3 where a thick portion of the hollow article was to be formed, so that the distal end of the gas supplying member 8 was connected with the gas passageway 9 and arranged so that the proximal end of the gas supply member 8 defined a continuous plane with the mold surface of the male mold member 3.

When a cavity clearance between the male mold member 3 and the female mold member 2 was 5 mm at a a main portion, a molten polypropylene resin (manufactured by Sumitomo Chemical Co., Ltd., Commercial name: Sumitomo Noblen BPZ5284, temperature: 210° C.) was supplied between mold surfaces of the mold members 2 and 3 by injection through a resin passageway 7 provided in the male mold member 3.

At approximately the same time that the step of supplying the predetermined amount of molten polypropylene resin to the cavity was completed, the female mold member 2 was lowered in the mold clamping direction until the clamping force became 150 ton f(F1) in order to flow the molten polypropylene resin and fill the mold cavity 5 with the molten polypropylene resin.

After the clamping force was raised to 150 ton f and the mold cavity 5 was filled with the molten polypropylene resin, the molten polypropylene resin was compressed with the clamping pressure of 150 ton f for 5 seconds. Thereafter, the clamping force was reduced to 20 ton f (F2), and at the same time the supply of compressed air from a gas supplying member 8 was initiated. The supplying pressure of compressed air was 6 kgf/cm².

The molten polypropylene resin was cooled for 40 seconds to solidify the resin while the clamping force was maintained at 20 ton f and compressed air supplied to the cavity 5. Thereafter, the supply of compressed gas was stopped, then the mold members 2 and 3 were opened, and a hollow article was removed from the assembly 10.

The resulting hollow article had a main portion that was about 3 mm in thickness, with a relatively thicker portion that was about 12 mm wide, 1200 mm long, and 13 mm thick. The hollow portion of the article extended approximately 80% in length relative to the entire length in the thick portion. The hollow article had a good appearance.

Example 2

A hollow article was produced in same manner as Example 1. The supply of compressed air having a pressure of 6 kgf/cm² was started at the same time that the clamping force was reduced from 150 ton f (F1) to 20 ton f (F2). The clamping force of 20 ton f (F2) was maintained for 20 seconds while compressed air was being supplied. Unlike in Example 1, however, the clamping force was then raised to 100 ton f (F3), and the clamping force of 100 ton f was then maintained for 20 seconds.

The hollow article had a hollow portion extending approximately 80% in length relative to the entire length of the thick portion of the molded article. Further, the hollow article had shape that exactly corresponded with the configuration of the mold cavity 5, such that the hollow articles even transcribed the configuration at the corners of the mold cavity 5. Accordingly, the appearance of the hollow article was improved in comparison with that of the hollow article obtained in Example 1.

Comparative Example 1

A hollow article was produced according to the same manner as Example 1 except that the clamping force was maintained at the first clamping force of 150 ton f(F1), and the clamping force was not reduced from F1.

The resulting hollow article had a little hollow portion in a thick region near a position where the gas supplying member contacted. The hollow portion extended approximately 20% in length relative to the entire length of the thick portion of the molded article.

The complete disclosures of any United States or foreign patents or patent applications mentioned or cited hereinabove are hereby incorporated by reference into the present specification.

It will thus be seen that the objectives and principles of this invention have been fully and effectively accomplished. It will be realized, however, that the foregoing preferred specific embodiments have been shown and described for the purpose of this invention and are subject to change without departure from such principles.

What is claimed is:

1. A process for producing an article having a hollow portion from at least one thermoplastic resin, said process comprising:

(a) providing an assembly comprising first and second mold members movable relative to each other between a closed position in which an inner surface of the assembly defines a cavity and an open position, the cavity being shaped to define a corresponding configuration to the article;

(b) supplying a charge containing at least one molten thermoplastic resin to at least one of the first mold member and the second mold member, said supplying being performed while the mold members are not in the closed position;

(c) moving the first mold member relative to the second mold member into the closed position so as to define the cavity;

(d) compressing the charge within the mold cavity by applying a first clamping force F1 to the charge by clamping the first and second mold members;

(e) reducing the clamping force from the first clamping force F1 to a second clamping force F2 before the molten thermoplastic resin in the mold cavity has completely solidified;

(f) supplying a compressed gas into at least one unsolidified portion of the molten thermoplastic subsequent to said (c) of moving the first mold member relative to the second mold member and before the molten thermoplastic resin in the mold cavity has completely solidified, wherein supplying (f) further comprises selecting a gas supply pressure p (kgf/cm2) in said supplying (f) and the second clamping force F2 (ton F) which satisfy a relationship of $0.3 \times F2 \times 1000 \div A \leq p \leq 2 \times F2 \times 1000 \div A$, wherein A ($cm^2$) represents a total projected area of a mold cavity defined by the first mold member and the second mold member on an imaginary plane arranged perpendicular to the mold clamping direction;

(g) cooling the molten thermoplastic resin in the mold cavity until the molten thermoplastic resin is at least substantially solidified; and (h) continuing said supplying a compressed gas to at least until the molten thermoplastic resin is at least substantially solidified so as to prevent deformation of the article.

2. The process according to claim 1, wherein said step (f) of supplying the compressed gas is initiated simultaneous with or subsequent to said step (e) of reducing the clamping force from the first clamping force F1 to the second clamping force F2.

3. The process according to claim 1, wherein said step (c) of moving the first mold member relative to the second mold member is initiated subsequent to completing said step (b) of supplying a charge.

4. The process according to claim 1, wherein said step (f) of supplying the compressed gas is performed under a gas supplying pressure within a range of not less than 1 $kgf/cm^2$ and less than 10 $kgf/cm^2$.

5. The process according to the claim 1, wherein the compressed gas is compressed air.

6. The process according to claim 1, which further comprises a step of applying a skin material to an inner surface of at least one of the first and second mold members.

7. The process according to claim 1, wherein said step (f) of supplying the compressed gas further involves varying the supply pressure.

8. The process according to claim 1, wherein the hollow article has a relatively thick portion.

9. The process according to claim 8, wherein the compressed gas is supplied at a portion of the cavity that corresponds to the relatively thick portion of the hollow article.

10. A process for producing an article having a hollow portion from at least one thermoplastic resin, said process comprising the steps of:

(a) providing an assembly comprising first and second mold members movable relative to each other between a closed position in which an inner surface of the assembly defines a cavity and an open position, the cavity being shaped to define a corresponding configuration to the article;

(b) supplying a charge containing at least one molten thermoplastic resin to at least one of the first mold member and the second mold member, said supplying step (b) being performed while the mold members are not in the closed position;

(c) moving the first mold member relative to the second mold member into the closed position so as to define the cavity;

(d) compressing the charge within the mold cavity by applying a first clamping force F1 to the charge by clamping first and second mold members;

(e) reducing the clamping force from the first clamping force F1 to a second clamping force F2 before the molten thermoplastic resin in the mold cavity has completely solidified;

(f) increasing the clamping force from the second clamping force F2 to a third clamping force F3 before the molten thermoplastic resin in the mold cavity has completely solidified;

(g) supplying a compressed gas into at least one unsolidified portion of the molten thermoplastic resin subsequent to said step (c) of moving the first mold member relative to the second mold member and before the molten thermoplastic resin in the mold cavity has completely solidified, wherein the compressed gas is supplied at a selected pressure p ($kgf/cm^2$) and the second clamping force F2 (ton f) is selected to satisfy a relationship of $0.3 \times F2 \times 1000 \div A \leq p \leq 3 \times F2 \times 1000 \div A$, wherein A ($cm^2$) represents a total projected area of a mold cavity defined by the first mold member and the second mold member on an imaginary plane arranged perpendicular to the mold clamping direction;

(h) cooling the molten thermoplastic resin in the mold cavity until the molten thermoplastic resin is at least substantially solidified; and (i) continuing said step (g) of supplying a compressed gas at least until the molten thermoplastic resin is at least substantially solidified so as to prevent deformation of the article.

11. The process according to claim 10, wherein said step (g) of supplying the compressed gas is initiated simultaneous with or subsequent to said step (e) of reducing the clamping force from the first clamping force F1 to the second clamping force F2.

12. The process according to claim 10, wherein said step of applying a first clamping force F1 is initiated subsequent to completing said step (c) of moving the first mold member relative to the second mold member.

13. The process according to claim 10, wherein said step (g) of supplying the compressed gas is performed under a gas supplying pressure within a range of not less than about 1 $kgf/cm^2$ and less than about 10 $kgf/cm^2$.

14. The process according to claim 10, wherein the compressed gas is compressed air.

15. The process according to claim 10, which further comprises a step of applying a skin material to an inner surface of at least one of the first and second mold members prior to said step (b).

16. The process according to claim 10, wherein said step (g) of supplying the compressed gas further involves varying the supply pressure.

17. The process according to claim 10, wherein the hollow article has a relatively thick portion.

18. The process according to claim 17, wherein the compressed gas is supplied at a portion of the cavity that corresponds to the relatively thick portion of the hollow article.

* * * * *